Nov. 8, 1927.  1,648,412
C. E. LINEBARGER
HYDROMETER
Filed June 2, 1925
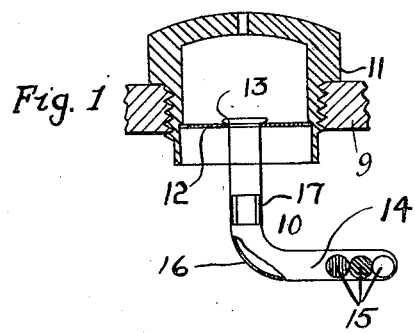
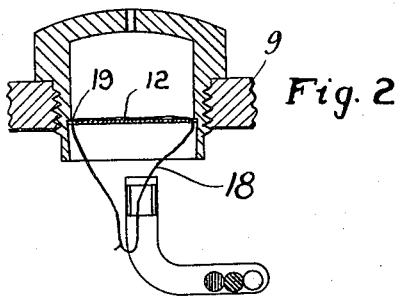
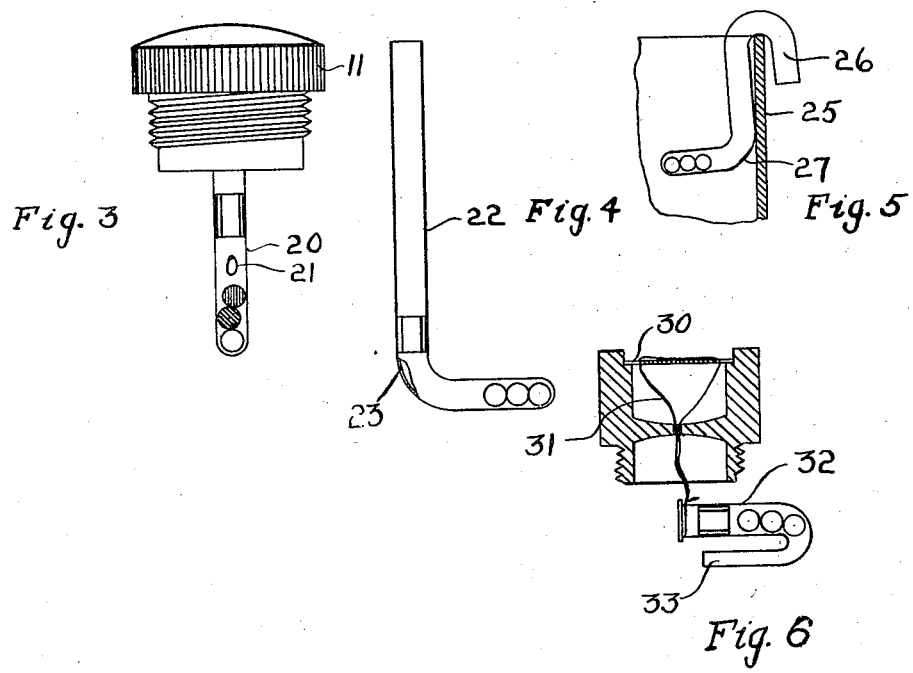
INVENTOR.
CHARLES E. LINEBARGER
BY
ATTORNEY.

Patented Nov. 8, 1927.

1,648,412

UNITED STATES PATENT OFFICE.

CHARLES E. LINEBARGER, OF CHICAGO, ILLINOIS.

HYDROMETER.

Application filed June 2, 1925. Serial No. 34,302.

This invention relates to hydrometers and particularly to means for testing the density of liquids contained in vessels similar to ordinary storage batteries. The various illustrations of the application of the invention which are described herein relate to storage batteries, but it is to be understood that applications of the invention to other purposes could be made. One object of the invention is to provide a very simple and convenient method and apparatus for determining the density of the electrolyte in batteries and at the same time for determining the height of the electrolyte in the vessel. The device thus indicates the condition of the electrolyte as to charge and also as to the need for distilled water.

Of the accompanying drawings Fig. 1 is an elevation partly in section of a device which embodies the features of my invention and which is my preferred form; Figs. 2, 3, and 6 illustrate various modifications of the device; and Figs. 4 and 5 illustrate devices used for similar purposes but applied and used in a somewhat different manner.

In general the preferred application of my invention is to combine the testing element 10 with the vent plug or cap 11 of a storage battery 9 so that when the plug is removed the testing element will be removed with the plug and at a glance the condition of the battery will be indicated.

The testing element or tube 10 is supported by the plug in any suitable manner, such as by means of a disk 12, such as is common in use with vent caps, the tube passing through an opening in the disk and being supported by a flange 13 on the upper end thereof. The lower end of the tube is preferably bent substantially at right angles, thus forming the horizontal arm 14, and in this arm are placed hydrometric units 15.

An opening 16 is provided in the elbow of the tube. Any suitable means may be used to prevent the units passing out of the tube, such as a constriction in the tube. I prefer for the purpose a rubber plug 17 inserted in the tube above the opening. This should be formed so as to allow the liquid to pass but not the hydrometric units. The plate or disk 12 is held in the cap by friction and may be readily removed by pulling on the tube. The tube may then be slipped out of the hole in the disk when desired for inspection or other purposes.

The hydrometric units may be of any suitable form or nature, provided that they are of nearly the same density as the desired density of the liquid to be tested. My preferred form of units are those described by Patent No. 1,424,730 issued to me on Aug. 1, 1922; but it is to be understood that other units may be used.

With the device as arranged it will be apparent that, when the cap is in place on the casing of the battery, the tube will project downwardly and if the vertical arm is of suitable length the arm 14 will pass into the upper portion of the electrolyte, and, with the openings 16, the electrolyte will pass freely into the arm; so that when the device is removed and the arm 14 is held vertically the units 15 will be surrounded by the electrolyte and will sink or rise therein according to the relative densities of the units and the electrolyte, thus testing in a well known manner the density of the liquid.

By having the device properly arranged with reference to the level of the electrolyte in the casing, that is so that the liquid when of proper elevation will substantially cover the arm 14 when the device is in place, the arm when removed will be entirely filled with liquid, but if the amount of liquid in the battery is insufficient, the arm will not be full; thus indicating a deficiency of liquid in the battery. Having thus tested the liquid in this manner the amount of charging or the distilled water necessary will be indicated.

Fig. 2 is a modification of the device in which the tube 14 is suspended from the disk 12 by means of a wire 18 supported by the disk 12, the wire passing through ordinary vent openings 19 in the periphery of the disk.

Fig. 3 shows a further modification in which the tube is supported in the cap in any suitable manner such as that indicated by Fig. 1 and the tube is straight instead of angular. This arrangement makes it unnecessary to take any special precautions in preventing the liquid from running out of the tube when the cap is removed, as it is necessary only to raise the cap upwardly. The opening 21 is provided to allow the liquid to flow freely into the tube but its position will prevent the liquid from flowing out.

Fig. 6 shows a further modification in which a different type of cap is shown, a disk 30 being mounted in the upper end of the cap instead of the lower end, and a wire 31 supporting a U-shaped tube 32. This tube is adapted to indicate the elevation of the liquid in the vessel as well as the density. When in the cell it will lie horizontally on the top of the plates but when raised it will hang vertically so that the liquid in the tube will be retained and the amount therein will indicate the depth in the cell.

Fig. 4 shows a hydrometer independent of the vent. The tube may be inserted in the liquid in any suitable manner, and it will indicate the density as well as the elevation of the liquid, substantially as has been described with reference to the other devices.

Fig. 5 is another modification in which the hydrometer is suspended on the edge of the vessel and may be very quickly elevated and the condition of the liquid determined thereby. The arm 26 is open at the lower end and an opening 27 is also provided in the elbow of the tube.

I claim as my invention:

1. In a storage battery a vent plug in combination with a hydrometer, said plug having a detachable plate mounted therein, and said hydrometer being suspended from said plate.

2. A hydrometer comprising a glass tube closed at one end, a hydrometric unit positioned in said end, the other end of said tube being open, and said tube having an opening in its wall between its ends.

3. A hydrometer comprising a tube having one end closed and the other end open, a hydrometric unit mounted in said tube, said tube being bent and having an opening in its wall at said bend.

In testimony whereof, I hereunto set my hand.

CHARLES E. LINEBARGER.